United States Patent

Minagawa et al.

[11] Patent Number: 5,984,829
[45] Date of Patent: Nov. 16, 1999

[54] SPEED CHANGE CONTROLLER FOR CONTINUOUSLY VARIABLE TRANSMISSION

[75] Inventors: Yuusuke Minagawa, Yokosuka; Kazuto Koyama, Nagano, both of Japan

[73] Assignee: Nissan Motor Co., Ltd., Yokohama City, Japan

[21] Appl. No.: 08/962,303

[22] Filed: Oct. 31, 1997

[30] Foreign Application Priority Data

Oct. 31, 1996 [JP] Japan .................................. 8-290279

[51] Int. Cl.[6] .................................................. F16H 61/00
[52] U.S. Cl. .............................. 477/98; 477/37; 477/43; 477/50; 476/10; 701/65
[58] Field of Search ........................ 477/37, 41, 43, 477/50, 98, 906; 476/10, 40; 701/55, 65

[56] References Cited

U.S. PATENT DOCUMENTS

| | | |
|---|---|---|
| 5,542,890 | 8/1996 | Nakano et al. . |
| 5,575,732 | 11/1996 | Inoue .................................... 477/50 X |
| 5,643,132 | 7/1997 | Inoue ........................................ 476/10 |
| 5,665,021 | 9/1997 | Inoue .................................... 477/37 X |
| 5,681,236 | 10/1997 | Inoue .................................... 477/50 X |
| 5,707,313 | 1/1998 | Suzuki ..................................... 477/43 |
| 5,711,741 | 1/1998 | Inoue ....................................... 476/10 |
| 5,807,206 | 9/1998 | Okazaki .................................... 477/98 |

FOREIGN PATENT DOCUMENTS 3-89066    4/1991    Japan .

OTHER PUBLICATIONS

Nakano et al., "Dynamic Characteristics of Speed Ratio Control of the Halt Toroidal CVT for Passenger Cars" *SAE Technical Papers Series* pp. 24–32 (1990).

*Primary Examiner*—Dirk Wright
*Assistant Examiner*—Peter T. Kwon
*Attorney, Agent, or Firm*—Foley & Lardner

[57] ABSTRACT

In a continuously variable transmission which varies a speed change ratio based on a target speed change ratio which has been set according to a running condition of a vehicle, a sensor is provided for detecting the temperature of the continuously variable transmission. A shift amount of the speed change ratio due to a thermal expansion difference of parts of the continuously variable transmission is prevented by correcting the target speed change ratio based on the temperature detected by the sensor.

5 Claims, 15 Drawing Sheets

SPEED CHANGE CONTROLLER FOR CONTINUOUSLY VARIABLE TRANSMISSION

FIELD OF THE INVENTION

This invention relates to speed control of a vehicle which has a continuously variable transmission.

BACKGROUND OF THE INVENTION

In a toroidal type continuously variable transmission for a vehicle as for example disclosed by U.S. Pat. No. 5,542,890, a speed change ratio varies according to a gyration angle of a plurality of power rollers enclosed between input discs and output discs. These power rollers are each supported by a trunnion.

The gyration angle of the power roller varies according to a force acting on the trunnion in a specific direction at right angles to both the rotation axis of the power roller and the rotation axis of the discs. This variation depends on a load applied by the input disc and output disc on the power roller according to a displacement of the power roller in the aforementioned specific direction.

Such dynamics are disclosed or example by SAE Technical Paper No. 901761.

The trunnion is driven by exerting an oil pressure supplied from a speed control valve on a piston which is fixed to the trunnion, as indicated for example in Tokkai Hei 3-89066 published in 1991 by the Japanese Patent Office. The speed control valve varies the oil pressure in response to a step motor which rotates according to a target speed change ratio. The target speed change ratio may be determined for example according to a vehicle speed Vsp and a throttle opening TVO.

On the other hand, the displacement of the trunnion is fed back by the speed control valve through a precess cam linked to the trunnion. In this way, feedback control of the power roller gyration angle is performed so that a real speed change ratio coincides with the target speed change ratio.

In this continuously variable transmission, in order to achieve the dual objectives of strength and lightweightness, the transmission casing and the housing of the speed control valve are constructed of an aluminum alloy, whereas parts which transmit mechanical force such as the trunnion, piston and precess cam are constructed of an iron alloy.

When the temperature of the parts and working oil rises according to running conditions, the trunnion which is constructed for example of iron alloy expands in the direction of displacement, while at the same time, the transmission casing which is constructed of aluminum alloy expands to a greater degree due to the difference of thermal expansion coefficient of iron and aluminum.

The neutral position of the continuously variable transmission is the position where the rotation axis of the power roller intersects with the rotation axis of the input/output discs in one plane. However, when the thermal expansion coefficients of the mechanical parts are different, this neutral position varies with temperature, and it becomes difficult to realize a precise target speed change ratio when the temperature changes. According to studies carried out by the inventors, a shift of 9% or more occurs in the speed change ratio for a temperature difference of 50° C.

SUMMARY OF THE INVENTION

It is therefore an object of this invention to suppress a shift of a speed change ratio due to a thermal expansion difference of parts in a continuously variable transmission.

In order to achieve the above object, this invention provides a speed change controller for use with a continuously variable transmission wherein the transmission varies a speed change ratio based on a control signal input to the transmission.

The controller comprises a sensor for detecting a temperature of the continuously variable transmission, and a microprocessor programmed to calculate a target speed change ratio according to a running condition of a vehicle, calculate a control signal corresponding to the target speed change ratio, calculate a shift amount of the control signal due to a thermal expansion difference of parts of the continuously variable transmission according to the temperature of the continuously variable transmission, calculate a corrected control signal by correcting the control signal by the shift amount, and output the corrected control signal to the transmission.

It is preferable that the continuously variable transmission further comprises a mechanism for varying the speed change ratio according to a pressure of a working oil, the sensor comprises a sensor for detecting a temperature of the working oil, and the microprocessor is further programmed to calculate the shift amount by looking up a map in which a relation between the temperature of the continuously variable transmission and the shift amount of the control signal is preset.

It is also preferable that the microprocessor is further programmed to determine a fault in the sensor, and to prohibit correction of the control signal by the shift amount when it is determined that the sensor has a fault.

This invention also provides a speed change controller for use with a continuously variable transmission wherein the transmission comprises a step motor driven based on a target speed change ratio, a speed change control valve for varying a pressure of a working oil in response to the step motor, and a mechanism for varying the speed change ratio according to the pressure of the working oil supplied by the speed change control valve The controller comprises a sensor for detecting a temperature of the continuously variable transmission, and a microprocessor programmed to calculate a drive signal of the step motor based on the target speed change ratio, calculate a shift amount of the drive signal due to a thermal expansion difference of parts of the continuously variable transmission according to the temperature of the continuously variable transmission, and correct the drive signal by this shift amount, and output the corrected drive signal to the step motor.

It is preferable that the microprocessor is further programmed to compare the corrected drive signal with an output drive signal output on the immediately preceding occasion, and repeat correction of the corrected drive signal such that a difference between the corrected drive signal and the output drive signal on the immediately preceding occasion does not exceed a predetermined value.

This invention also provides a speed change controller for use with a continuously variable transmission wherein the transmission varies a speed change ratio based on a control signal input to the transmission, comprising a mechanism for detecting a temperature of the continuously variable transmission, a mechanism for calculating a target speed change ratio according to a running condition of a vehicle, calculating a control signal corresponding to the target speed change ratio, a mechanism for calculating a shift amount of the control signal due to a thermal expansion difference of parts of the continuously variable transmission according to the temperature of the continuously variable transmission, a mechanism for calculating a corrected control signal by correcting the control signal by the shift amount, and a mechanism for outputting the corrected control signal to the transmission.

The details as well as other features and advantages of this invention are set forth in the remainder of the specification and are shown in the accompanying drawings.

DESCRIPTION OF THE PREFERRED EMBODIMENTS

Figure 1:
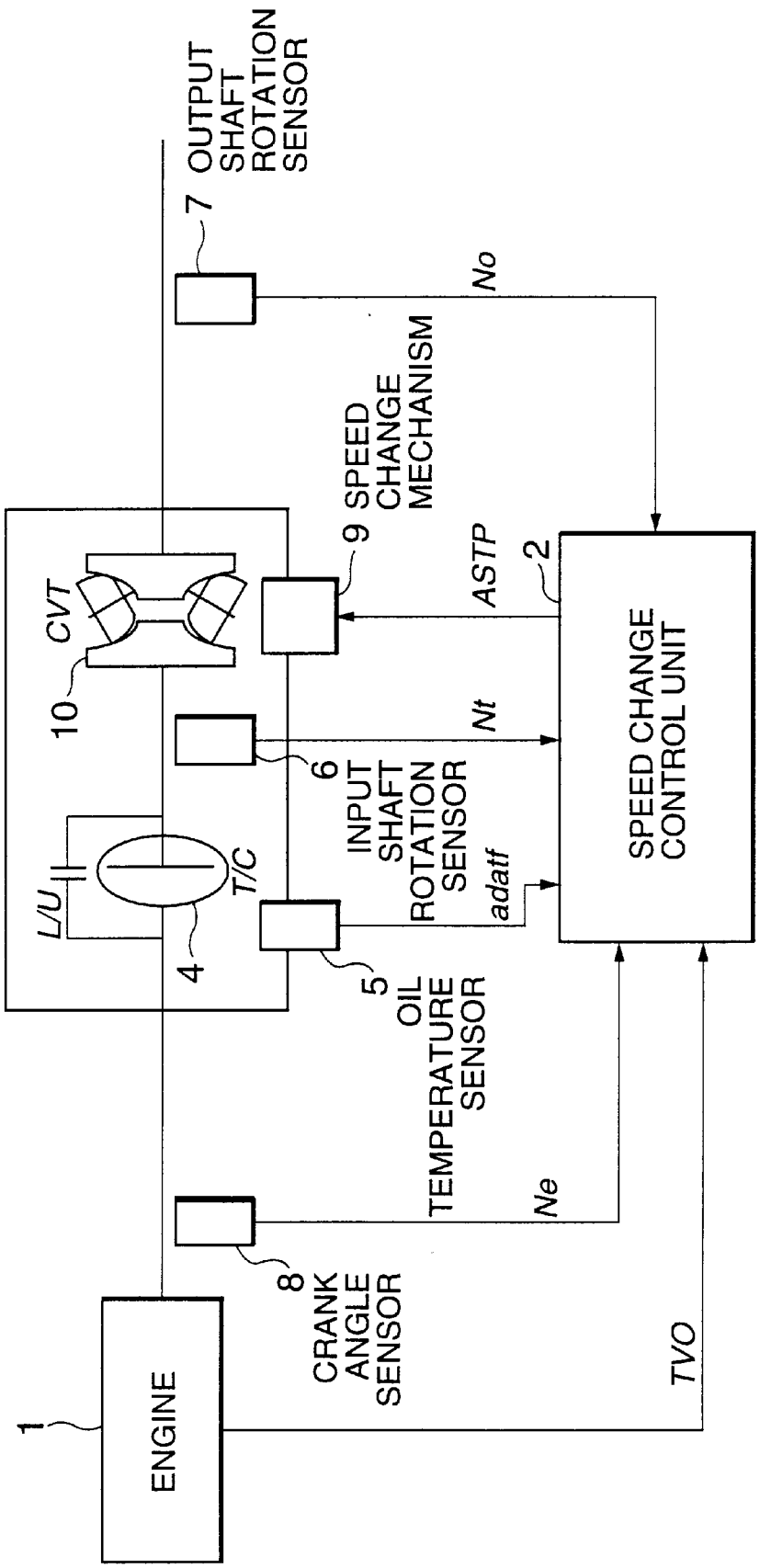
FIG. 1 is a block diagram of a speed change controller of a continuously variable transmission according to this invention.

Referring to FIG. 1 of the drawings, a toroidal type continuously variable transmission (CVT) 10 for a vehicle is controlled to a predetermined speed ratio by a speed change mechanism 9 in response to a signal from a speed change control unit 2.

Figure 2:
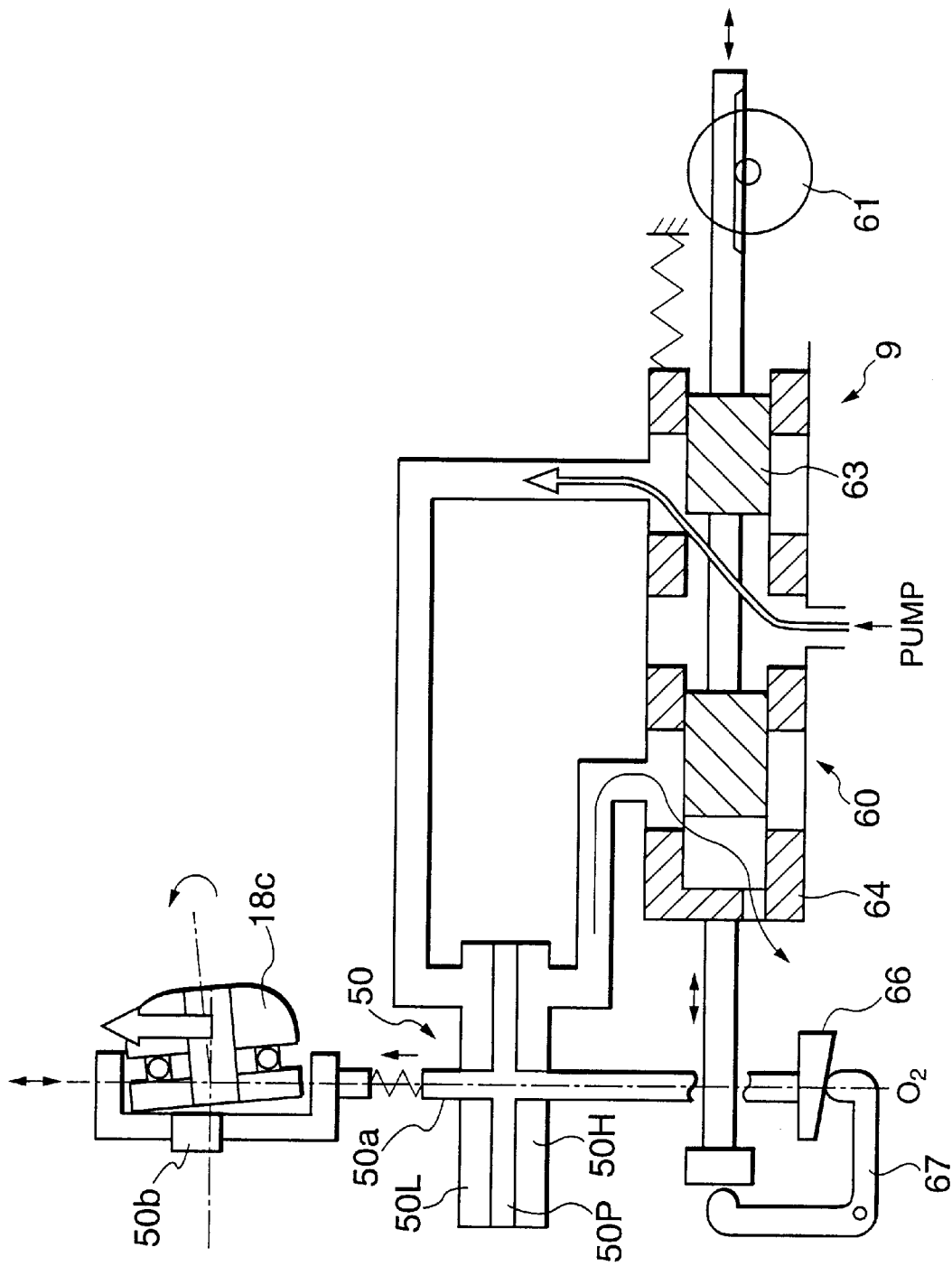
FIG. 2 is a schematic diagram of a speed change mechanism of the continuously variable transmission.

The continuously variable transmission 10 varies the speed change ratio according to a gyration angle of a power roller 18c gripped between an input disc and output disc, not shown, as illustrated in FIG. 2.

Referring to FIG. 1, a torque converter 4 comprising a lock up clutch L/U is interposed between an engine 1 and the continuously variable transmission 10 mounted on the vehicle.

A throttle opening TVO of an engine 1 or an accelerator opening ACS, and an engine rotation speed detected by a crank angle sensor 8, are input to the speed change control unit 2. Also input are an input shaft rotation speed Nt detected by an input shaft rotation sensor 6 provided in the continuously variable transmission 10, which is equal to the output shaft rotation speed of the torque converter 4, an output shaft rotation speed No detected by an output shaft rotation sensor 7 provided in the continuously variable transmission 10, and a working oil temperature detection value adatf of the continuously variable transmission 10 detected by an oil temperature sensor 5.

Figure 8:
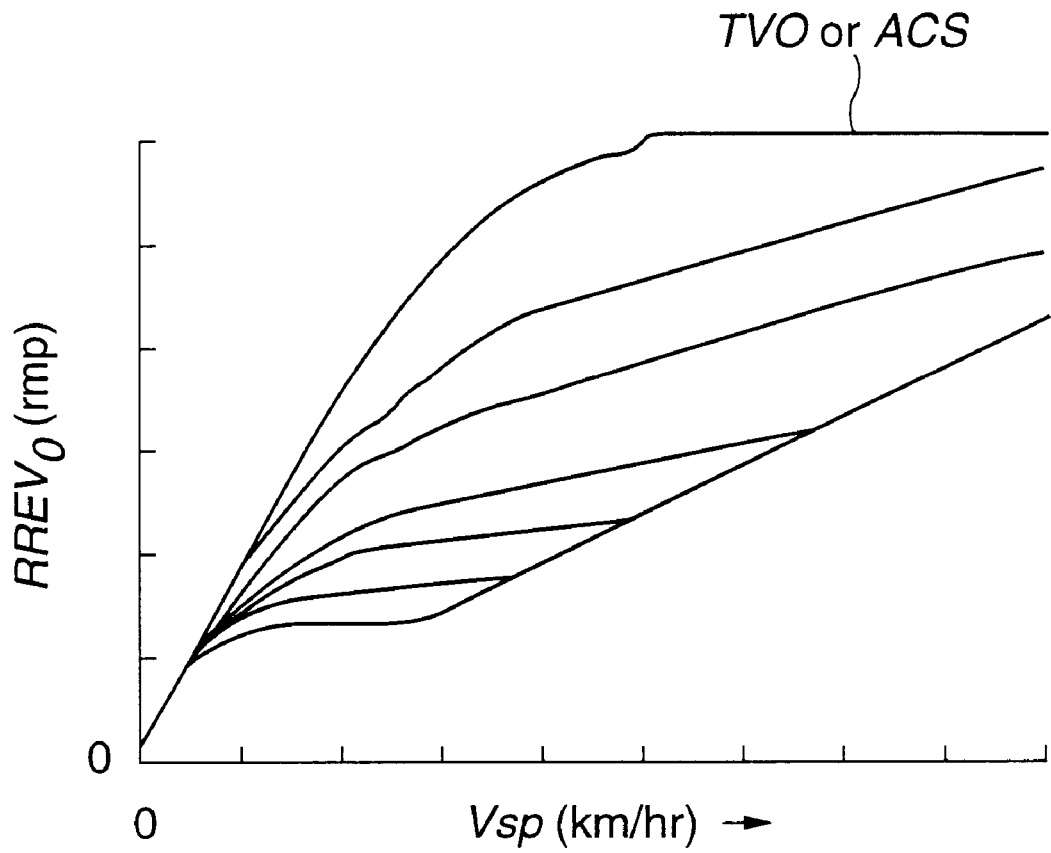
FIG. 8 is a diagram showing the contents of a map of a target input shaft rotation speed $RREV_0$ stored by the speed change controller.

The speed change control unit 2 calculates a target input shaft rotation speed RREV according to running conditions from a preset speed change map, and supplies a control amount AST to a step motor 61 according to a real target speed change ratio $RTO_1$, as shown in FIG. 8.

A speed change mechanism 9 comprises a control valve 60 driven by the step motor 61, as shown in FIG. 2.

Further provided are an oil pressure actuator 50 which drives a trunnion 50a supporting a power roller 18c of the continuously variable transmission 10 in the direction of an axial line O2 in FIG. 2, and a precess cam 66 and link 67 which feed back a real speed change ratio to the control valve 60.

The step motor 61 drives a spool 63 of the control valve 60 according to a command from the speed change control unit 2 so as to increase or decrease the oil pressures of oil chambers 50H, 50L above and below a piston 50P of the oil pressure actuator 50. On the other hand, the displacement of the trunnion 50a according to this oil pressure, i.e. a real speed change ratio RTO, is fed back to a sleeve which moves relative to the spool 63 via the precess cam 66 and link 67.

Figure 11:
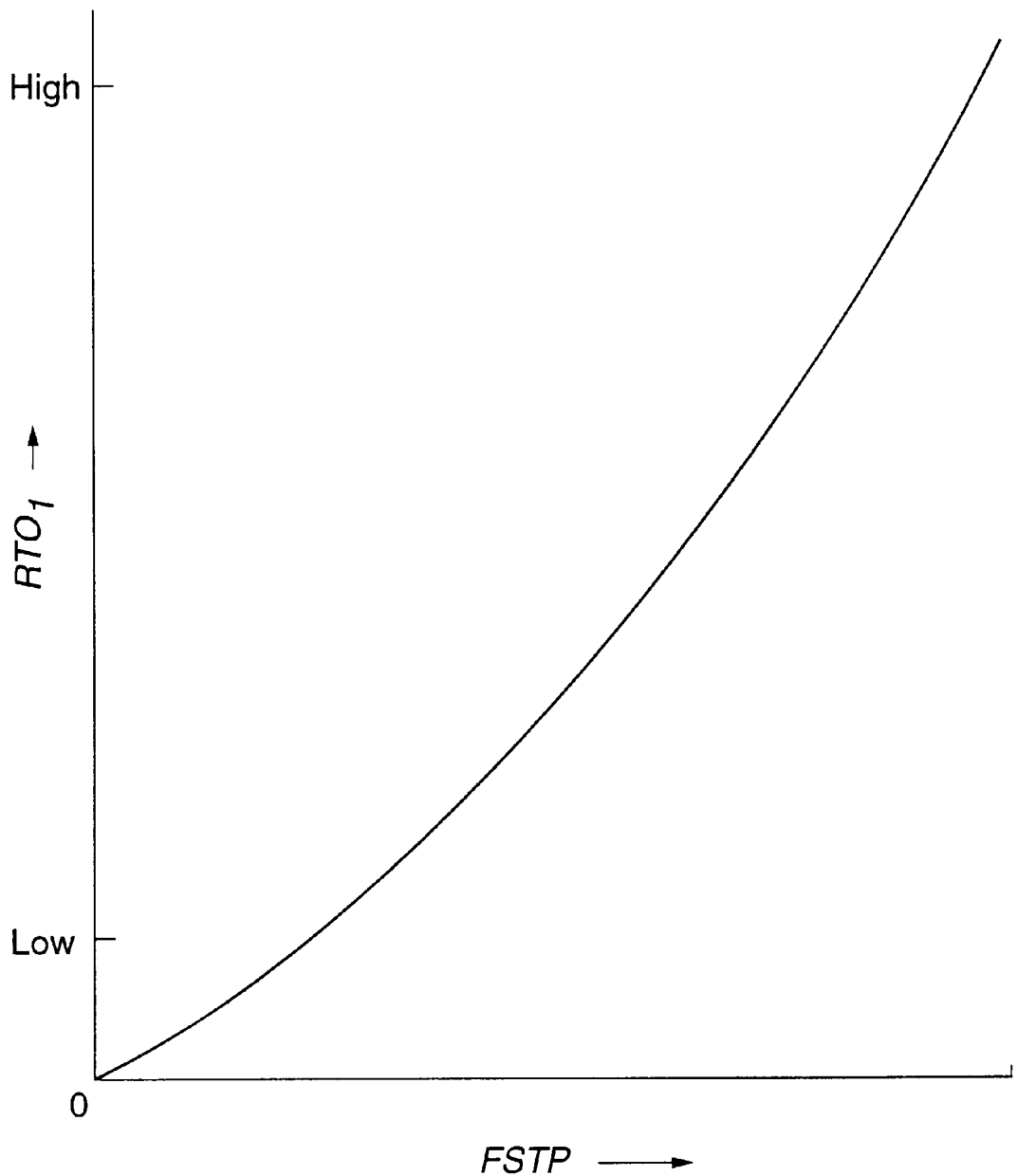
FIG. 11 is a diagram showing the contents of a map of a control step number FSTP stored by the speed change controller.

In this way, the oil pressure acting on the actuator 50 is controlled such that the real speed change ratio RTO coincides with a target speed change ratio $RTO_0$. The speed change ratio of the transmission under No load conditions is determined uniquely according to the step number of the step motor 61, as shown in FIG. 11.

The speed change control processes performed by the speed change control unit 2 are shown in the flowcharts of FIG. 3–FIG. 7. Each process is executed at a predetermined interval of, for example, 10 msec.

Figure 3:
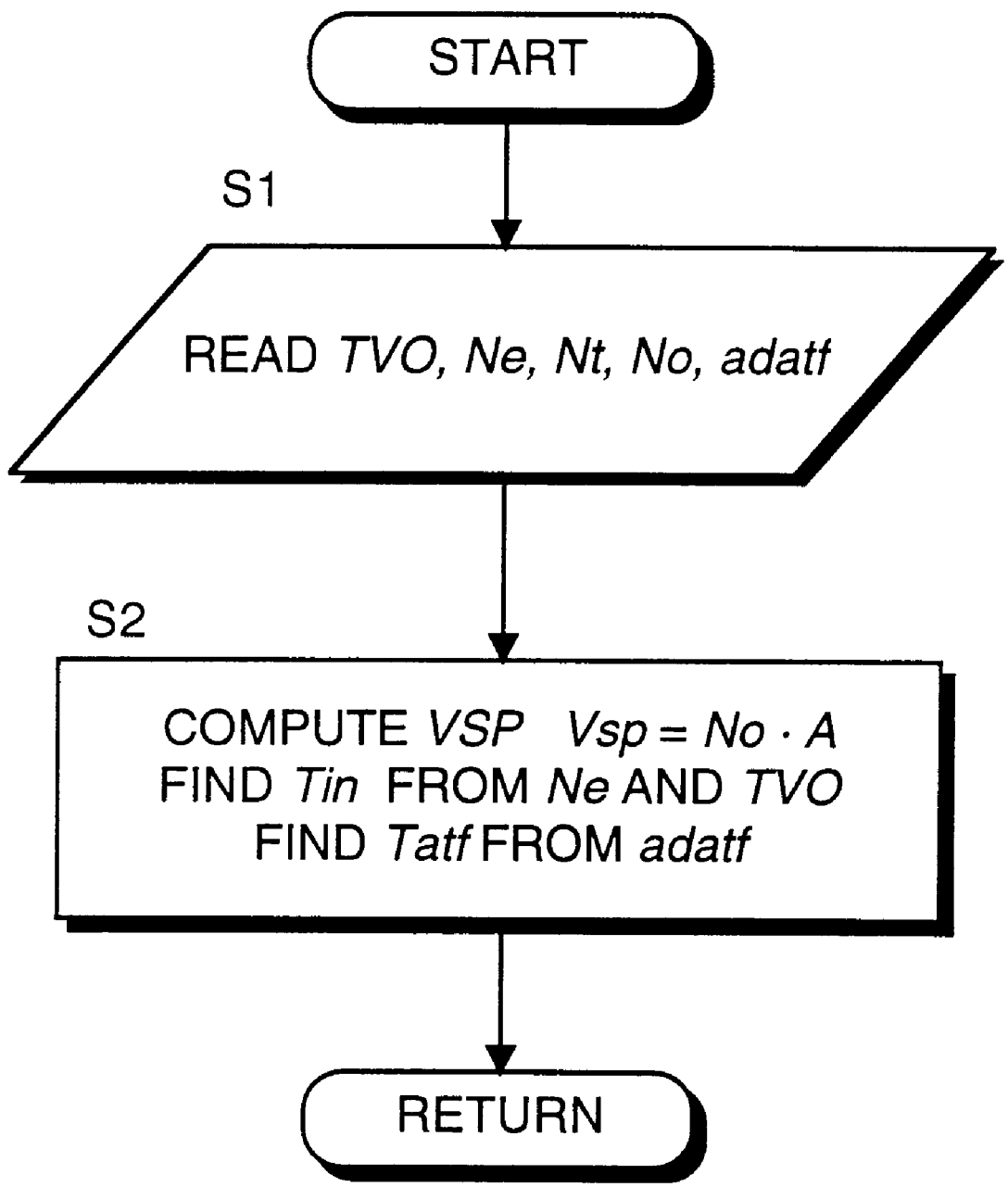
FIG. 3 is a flowchart describing a running condition detection process performed by the speed change controller.

FIG. 3 shows a process of detecting the running state of the vehicle.

First, in a step S1, the throttle opening TVO and engine rotation speed Ne are read as running conditions of the engine 1. The input shaft rotation speed Nt, output shaft rotation speed No and working oil temperature adatf are also read.

In a step S2, values are computed showing the running state of the vehicle.

Figure 9:
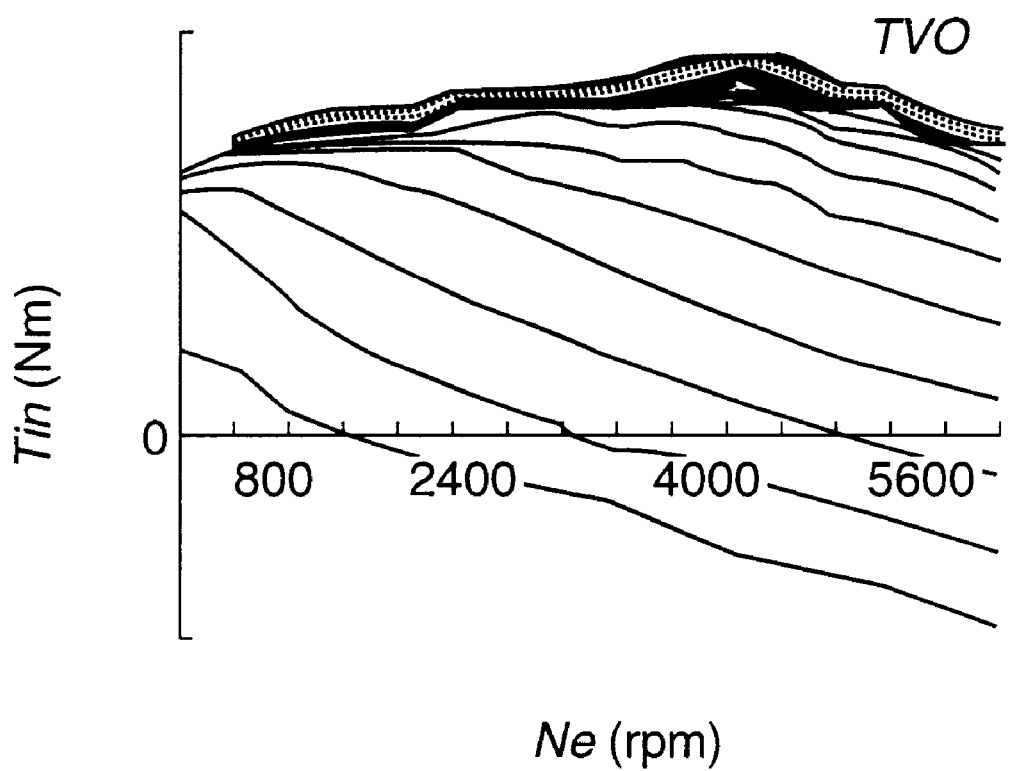
FIG. 9 is a diagram showing the contents of a map of estimated engine torque Tin stored by the speed change controller.
Figure 12:
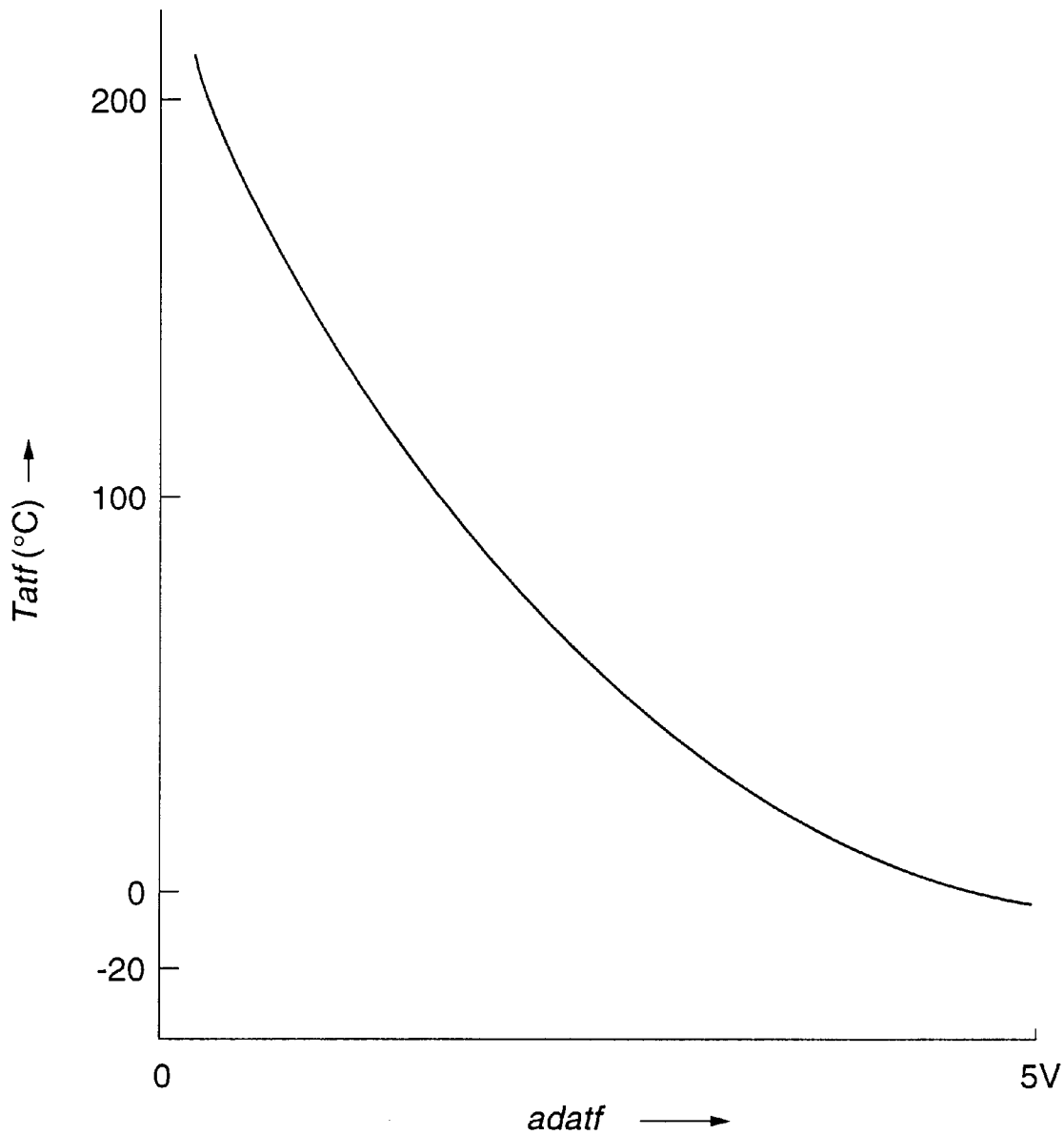
FIG. 12 is a diagram showing the contents of a map of an oil temperature Tatf stored by the speed change controller.

First, the output shaft rotation speed No is multiplied by a conversion constant A to obtain a vehicle speed Vsp. Next, an estimated engine torque Tin is found by looking up a map in FIG. 9 from the engine rotation speed Ne and the throttle opening TVO. The oil temperature Tatf of the continuously variable transmission 10 is also found referring to a map in FIG. 12 from the working oil temperature adatf.

Figure 4:
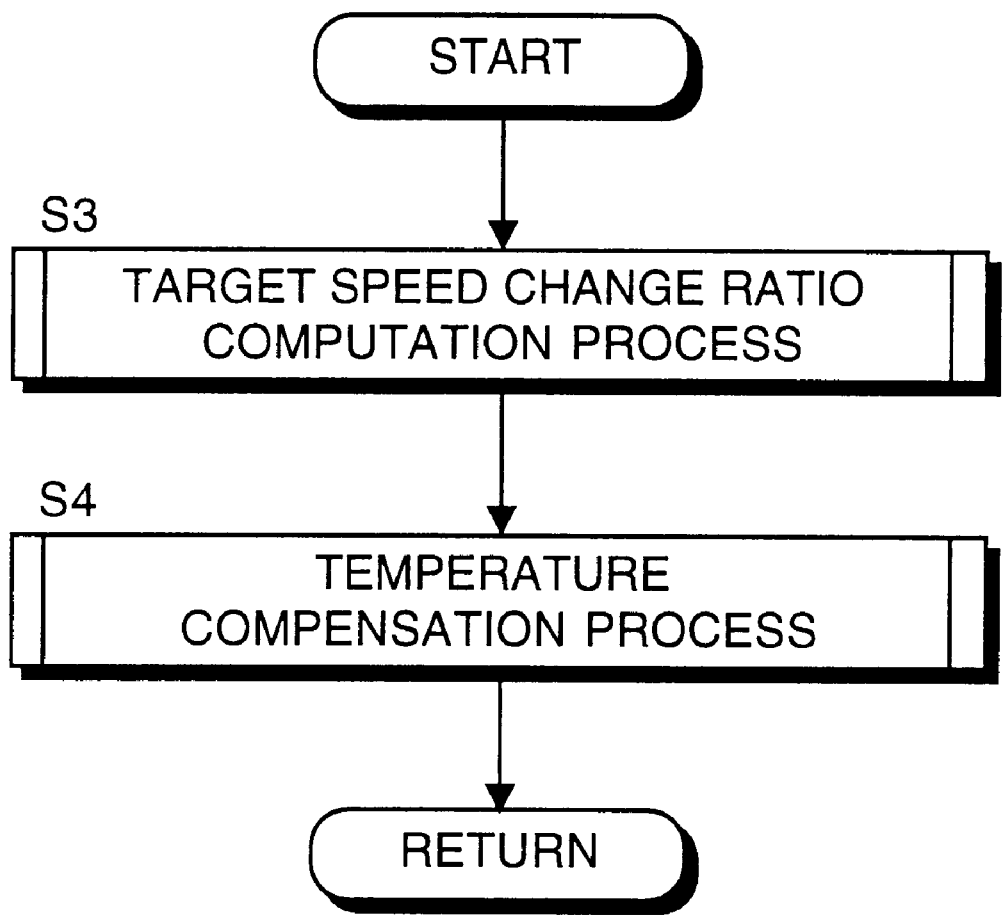
FIG. 4 is a flowchart describing a speed change ratio computing process performed by the speed change controller.

As shown in FIG. 4, the main parts of the speed control process may be broadly classified into a target speed change ratio computation process of a step S3, and a temperature compensation process of a step S4 for calculating a number of steps ASTP output to the step motor 61 whereby temperature compensation is added to the target speed change ratio. The calculated number of steps ASTP is output to the step motor 61 in a step S5 of FIG. 5.

Figure 6:
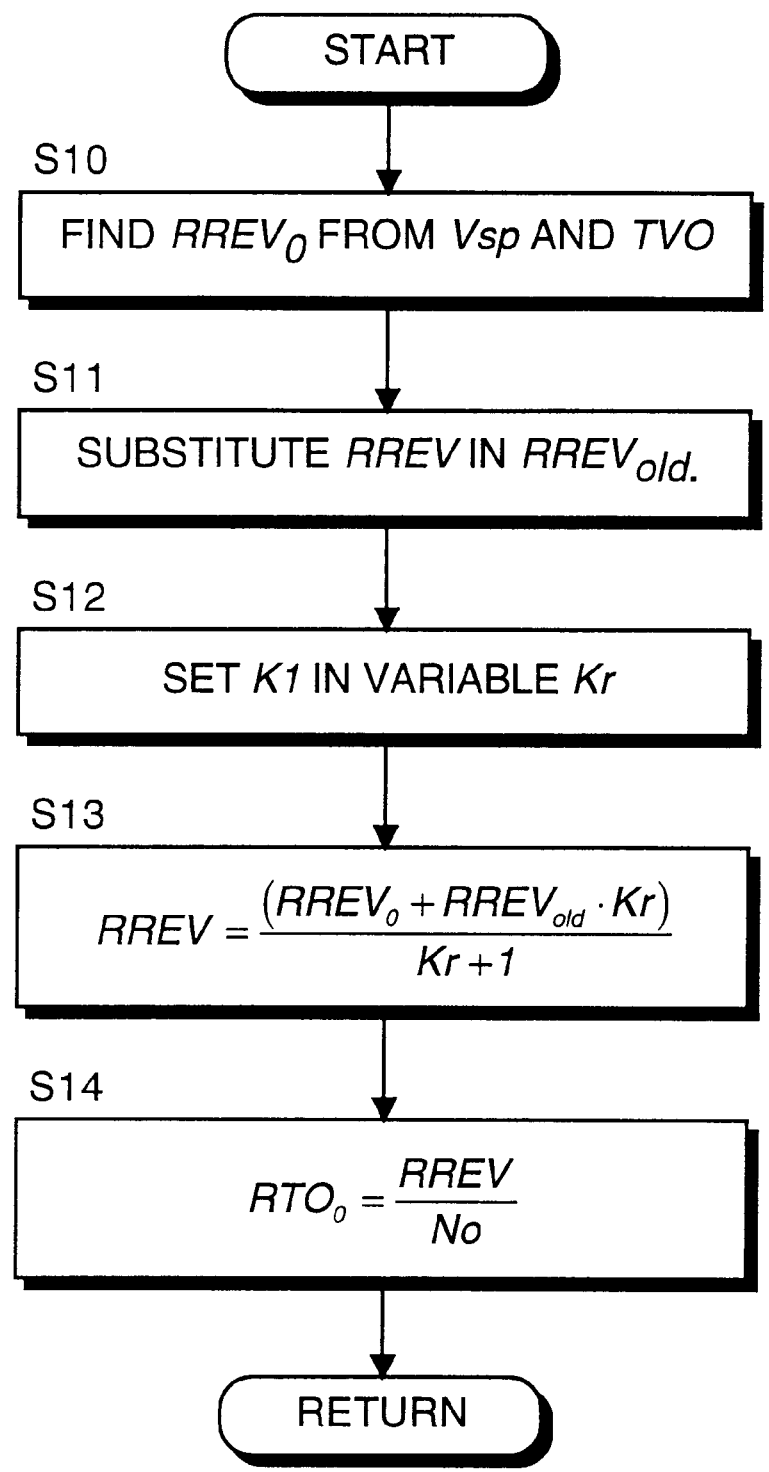
FIG. 6 is a flowchart describing a process for computing a target speed change ratio performed by the speed change controller.

First, the process of computing the target speed change ratio of the step S3 will be described referring to a flowchart in FIG. 6.

In a step S10, a target input shaft rotation speed map value $RREV_0$ is found from the vehicle speed Vsp and throttle opening TVO, which were determined in the running state detection process of FIG. 3, by looking up a map in FIG. 8.

In a step S11, the target input shaft rotation speed RREV found in the immediately preceding cycle is substituted in an immediately preceding value $RREV_{old}$.

In a step S12, a first-order delay time-constant K1 is set in a variable Kr.

In a step S13, the first-order delay target input shaft rotation speed RREV is found from the aforesaid target input shaft rotation speed map value $RREV_0$, immediately preceding value $RREV_{old}$ and time-constant Kr, based on the following equation:

$$RREV = \frac{(RREV_0 + RREV_{old} \cdot Kr)}{Kr+1}$$

Figure 14:
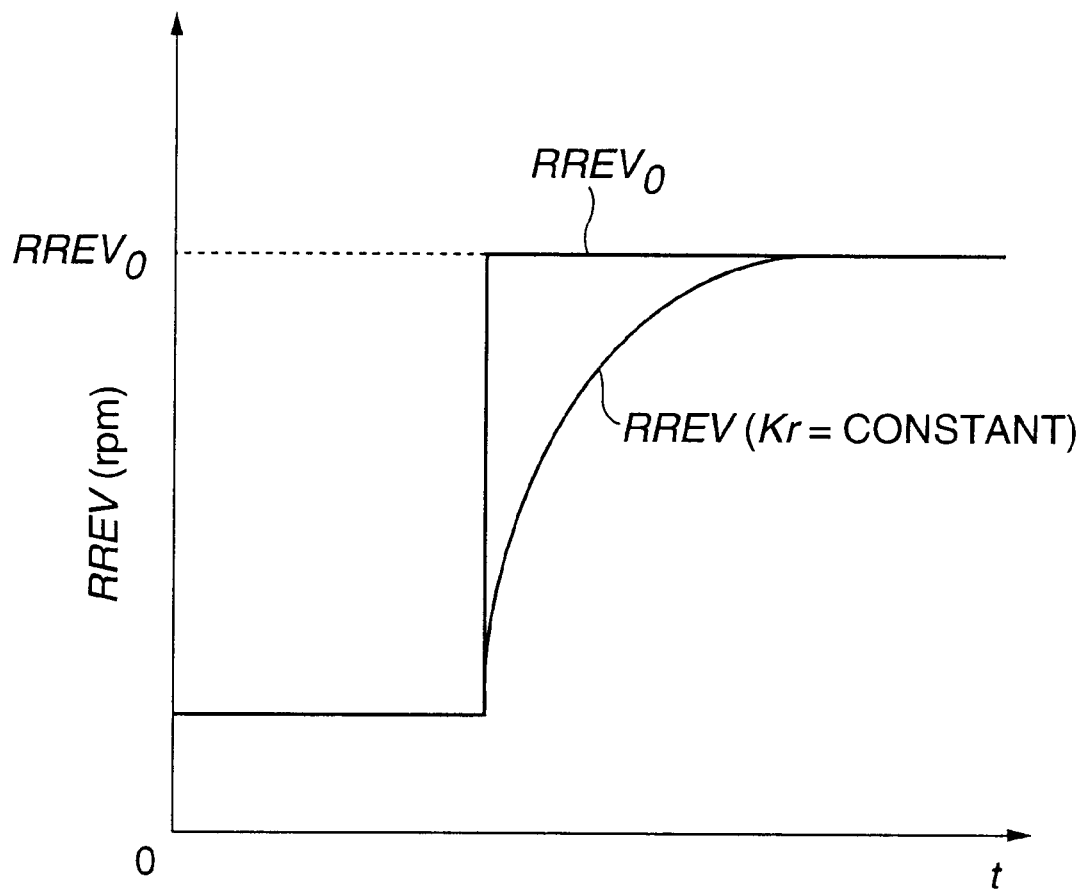
FIG. 14 is a diagram showing the characteristics of a first order delay engine rotation speed RREV calculated by the speed change controller.

The relation of the target input shaft rotation speed map value $RREV_0$ and the target input shaft rotation speed RREV according to this equation is shown in FIG. 14. As shown in the figure, when there transmission shifts down rapidly, the real target input shaft rotation speed RREV increases gradually towards the map value $RREV_0$ according to the first-order delay time-constant Kr (=K1).

In other words, the variation rate of the rotation speed is reduced by the first-order delay time-constant K1, and speed change shocks when there is a sharp variation of the target input shaft rotation speed $RREV_0$ due to a kick down shift are mitigated.

In a step S14, the target speed change ratio $RTO_0$ is computed from the target input shaft rotation speed RREV and output shaft rotation speed found in the step S13, from the following equation:

$$RTO_0 = \frac{RREV}{No}$$

The computation of the target speed change ratio $RTO_0$ assumes that the lock up clutch L/U of the torque-converter 4 is always engaged while the vehicle is running. In other words, it may be considered that the input torque of the continuously variable transmission 10 is equal to the output torque of the engine 1.

Next, referring to the flowchart of FIG. 7, the temperature compensation process of the step S4 will be described.

Figure 10:
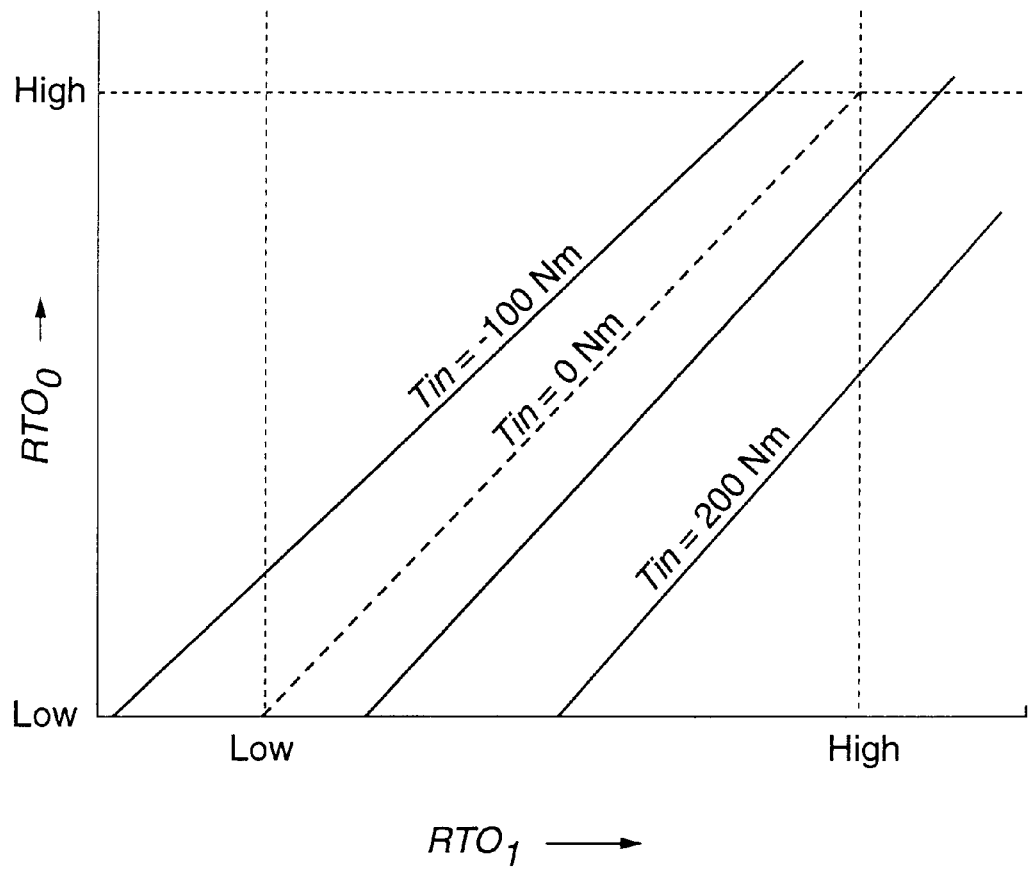
FIG. 10 is a diagram showing the contents of a map of a real target speed change ratio $RTO_1$ stored by the speed change controller.

In a step S20, the real target speed change ratio $RTO_1$ which takes account of a torque shift of the continuously variable transmission 10, is computed from the target speed change ratio $RTO_0$ found in the step S14 and the estimated engine torque Tin found in the step S2 by looking up a map in FIG. 10.

Torque shift refers to a phenomenon wherein, when the trunnion 50a displaces in the direction of an axial line $O_2$, the power roller 18c oscillates about an perpendicular to the axial line $O_2$ as shown in FIG. 2.

As a result of this torque shift, a load acts on the power roller 18c in a gyration direction, and the power roller 18c gyrates. When the forces acting on the power roller 18C are balanced at a new gyration angle, the torque shift disappears.

The map of FIG. 10 avoids the effect of such a torque shift produced in the toroidal type continuously variable transmission 10, and updates the real target speed change ratio $RTO_1$ according to the input torque which is equal to the estimated engine torque Tin. This map is preset according to the characteristics of the continuously variable transmission 10.

In a step S21, a control step number FSTP of the step motor 61 is found from the real target speed change ratio $RTO_1$ based on a map of control step number in FIG. 11.

In a following step S100, it is checked whether or not a temperature sensor 5 is normal. For example, it is determined whether or not an output voltage of the temperature sensor 5 is at least equal to a predetermined voltage. When the temperature sensor 5 is normal, the routine proceeds to a step S22, and when it is not normal the routine proceeds to a step S101.

Figure 13:
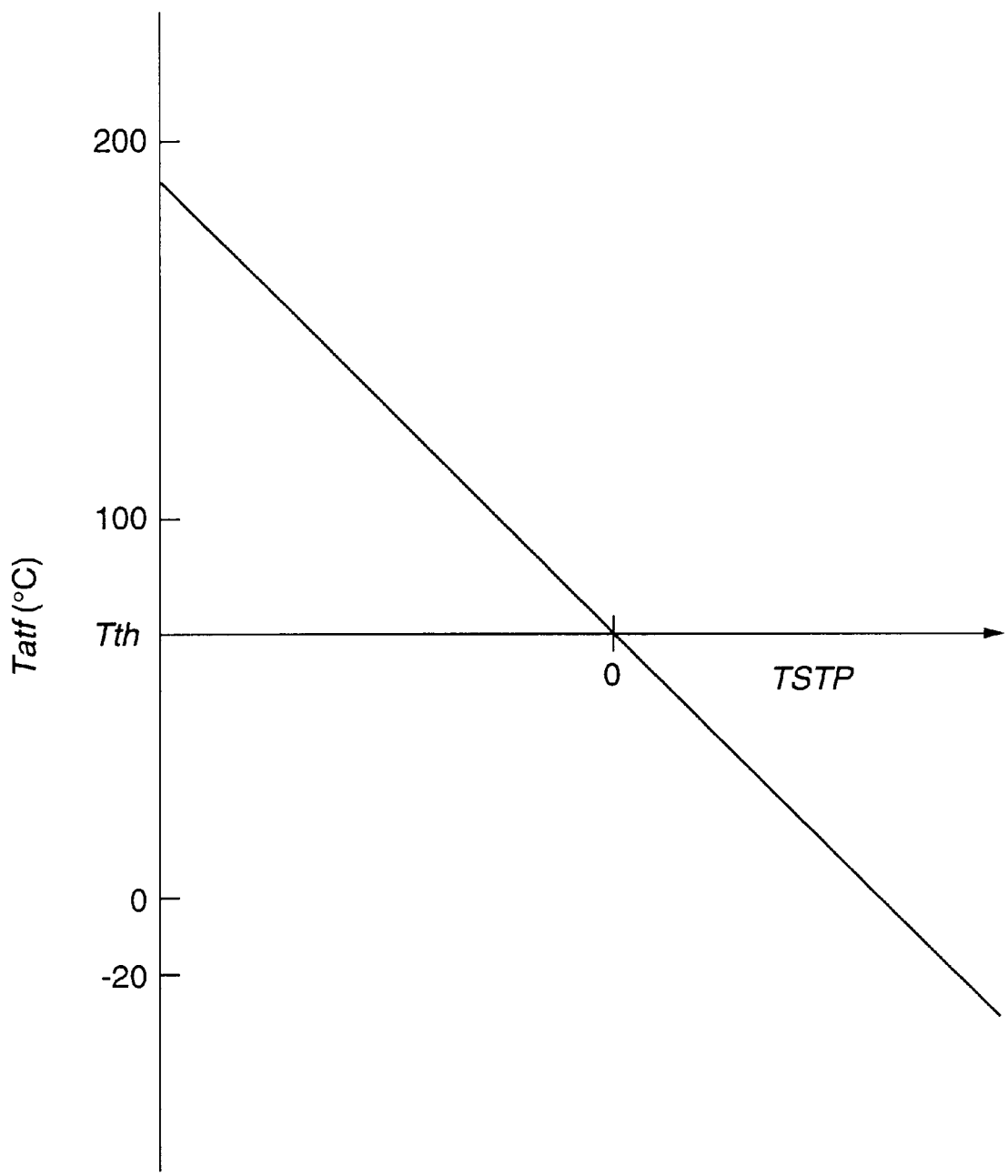
FIG. 13 is a diagram showing the contents of a map of a temperature compensation step number TSTP stored by the speed change controller.

In a map of FIG. 13, the relation between a temperature compensation step number TSTP and the oil temperature Tatf is specified by a first order function, however the geometry is slightly different due to the thermal expansion of all parts of the continuously variable transmission 10.

For example, a contact point between the power roller 18c and the input/output discs is shifted due to a change in the length of the trunnion 50a.

Therefore it is desirable that the map of FIG. 13 is drawn based on real experimental data obtained by varying the temperature of the transmission, in which case the map may be a curve.

However, when it is determined in the step S100 that there is a fault, e.g. due to a break in the wiring of the temperature sensor 5, the temperature compensation step number TSTP is fixed at a preset value $TSTP_0$ in the step S101. The value of this $TSTP_0$ is set to the temperature compensation step number for an average oil temperature when the vehicle is running.

In a step S23, a target step number DSRSTP is computed from the sum of the control step number FSTP found from the steps S21 and S22, and the temperature compensation step number TSTP, as follows:

DSRSTP=FSTP+TSTP

In a step S24, a current control amount ASTP is compared with a target step number DSRSTP.

When ASTP≦DSRSTP, the routine proceeds to a step S27, and the control amount DSTP increases in steps of a control amount DSTP per unit time.

Figure 15:
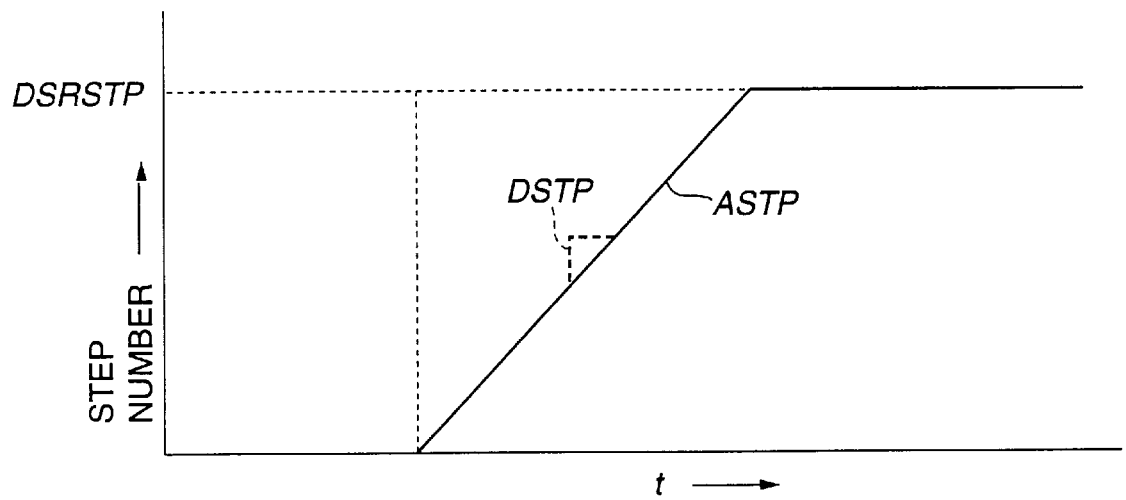
FIG. 15 is a diagram describing a step number variation output by the speed change controller to a step motor.

The control amount DSTP per unit time is a limiting value to define variation of step number according to the response speed of the step motor 61. In a following step S28, the increased control amount ASTP is again compared with the target value DSRSTP, and when ASTP>DSRSTP, ASTP=DSRSTP is set in a step S29 and the routine is terminated. When ASTP≦DSRSTP, the routine is terminated. When ASTP>DSRSTP in a step S24, the routine proceeds to a step S25, and the control amount ASTP is decreased by the control amount DSTP per unit time. In a step S26, the decreased control amount ASTP is again compared with the target value DSRSTP, and when ASTP<DSRSTP, ASTP=DSRSTP is set in the step S29 and the routine is terminated. When ASTP≧DSRSTP, the routine Is Immediately terminated Due to the process of the above-mentioned steps S24–S29, as shown in FIG. 15, the control signal ASTP output by the step motor 61 increases and decreases in steps of the control amount DSTP per unit time until it becomes equal to the target step number DSRSTP. Finally, a spool 63 of the control valve 60 drives the step motor 61 to a position corresponding to the speed change ratio $RTO_1$.

Figure 5:
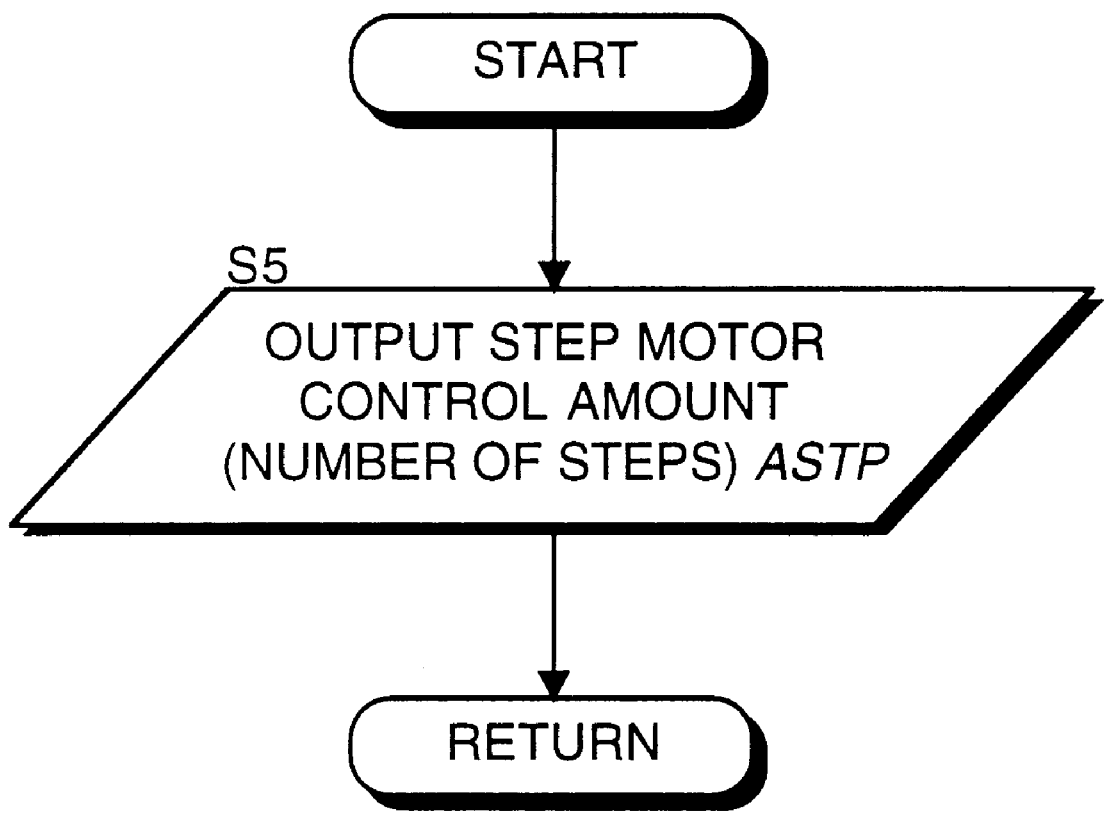
FIG. 5 is a flowchart describing a signal output process performed by the speed change controller.
Figure 7:
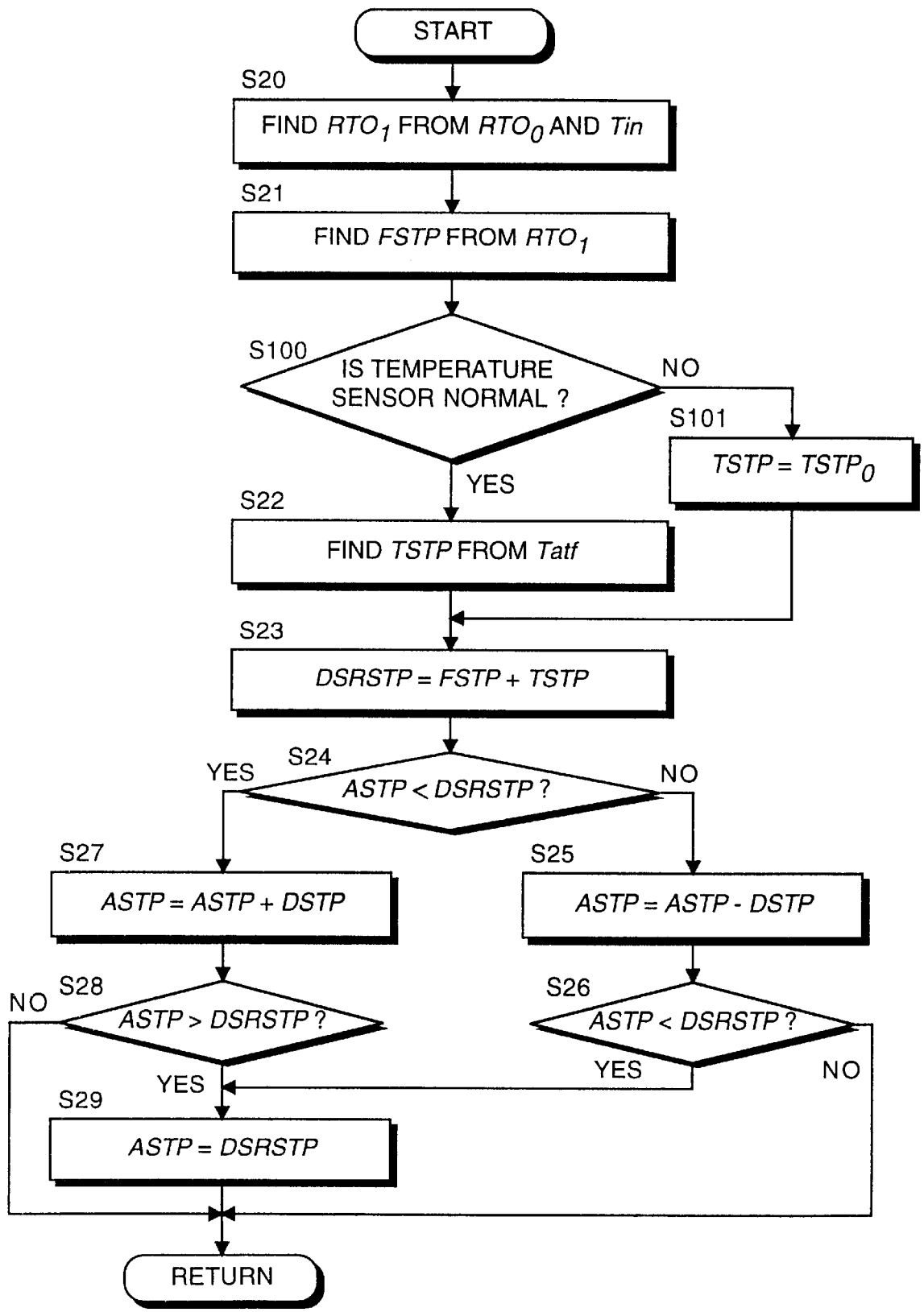
FIG. 7 is a flowchart describing a temperature compensation process performed by the speed change controller.

Hence, the control amount ASTP obtained from the flowchart of FIG. 7 is output to the step motor 61 from the speed change control unit 2 in the step S5 of the signal output part of FIG. 5, the power roller 18c is caused to gyrate according to the oil pressure supplied by the control valve 60, and the target speed change ratio $RTO_1$ is precisely realized regardless of the working oil temperature Tatf.

In this way, by compensating the target control amount FSTP of the step motor 61 obtained from the real target speed change ratio $RTO_1$ according to the working oil temperature Tatf of the continuously variable transmission 10, the speed change control unit 2 suppresses fluctuation of the speed change ratio of the piston about the neutral point due to thermal expansion differences in the transmission 10, and therefore the target speed change ratio can always be precisely realized.

In the above embodiment, the working oil temperature of the continuously variable transmission 10 is detected by the temperature sensor 5, but if the temperatures of parts of the transmission 10, such as for example the trunnion 50a, are measured directly, temperature compensation accuracy may be further improved.

Alternatively the temperature of the engine cooling water or of the engine lubricating oil, not shown, may be detected, and the temperature of the continuously variable transmission 10 estimated from this temperature.

Further, the compensation amount was set as a map based on the working oil temperature of the continuously variable transmission 10, but this compensation amount may be approximated by an arithmetic expression.

The above embodiment applies to a continuously variable transmission of the toroidal type, but it may be applied also to continuously variable transmissions of other types such as a V-belt.

The corresponding structures, materials, acts, and equivalents of all means plus function elements in the claims below are intended to include any structure, material, or acts for performing the functions in combination with other claimed elements as specifically claimed.

The embodiments of this invention in which an exclusive property or privilege is claimed are defined as follows:

1. A speed change controller for use with a toroidal type continuously variable transmission wherein said continuously variable transmission comprises a step motor driven based on a target speed change ratio, a speed change control valve for varying a pressure of a working oil in response to said step motor, and a mechanism for varying said speed change ratio according to the pressure of said working oil supplied by said speed change control valve, said controller comprising:

a sensor for detecting a temperature of said continuously variable transmission, and a microprocessor programmed to:
calculate a drive signal of said step motor based on said target speed change ratio,
calculate a shift amount of said drive signal due to a thermal expansion difference of parts of said continuously variable transmission according to the temperature of said continuously variable transmission, and
correct said drive signal by the shift amount, and output said corrected drive signal to said step motor so that a position of said speed change control valve changes according to the detected temperature of said continuously variable transmission.

2. A speed change controller as defined in claim 1, wherein said continuously variable transmission further comprises a mechanism for varying said speed change ratio according to a pressure of a working oil, said sensor comprises a sensor for detecting a temperature of said working oil, and said microprocessor is further programmed to calculate said shift amount by looking up a map in which a relation between the temperature of said continuously variable transmission and the shift amount of the control signal is preset.

3. A speed change controller for use with a continuously variable transmission wherein said transmission varies a speed change ratio based on a control signal input to said transmission, said controller comprising:

a sensor for detecting a temperature of said continuously variable transmission, and a microprocessor programmed to:
calculate a target speed change ratio according to a running condition of a vehicle,
calculate a control signal corresponding to the target speed change ratio,
calculate a shift amount of the control signal due to a thermal expansion difference of parts of said continuously variable transmission according to the temperature of said continuously variable transmission,
calculate a corrected control signal by correcting the control signal by the shift amount,
output the corrected control signal to said transmission, and wherein said microprocessor is further programmed to determine a fault in said sensor, and to prohibit correction of the control signal by said shift amount when it is determined that said sensor has a fault.

4. A speed change controller for use with a toroidal type continuously variable transmission, wherein said continuously variable transmission comprises a step motor driven based on a target speed change ratio, a speed change control valve for varying a pressure of a working oil in response to said step motor, and a mechanism for varying said speed change ratio according to the pressure of said working oil supplied by said speed change control valve, said controller comprising:

sensing means for detecting a temperature of said continuously variable transmission, and programming means programmed to:
calculate a drive signal of said step motor based on said target speed change ratio,
calculate a shift amount of said drive signal due to a thermal expansion difference of parts of said continuously variable transmission according to the temperature of said continuously variable transmission, and
correct said drive signal by this shift amount, and output said corrected drive signal to said step motor so that a position of said speed change control valve changes according to the detected temperature of said continuously variable transmission.

5. A speed change controller for use with a continuously variable transmission wherein said transmission varies a speed change ratio based on a control signal input to said transmission, said controller comprising:

a sensor for detecting a temperature of said continuously variable transmission, and a microprocessor programmed to:

calculate a drive signal of said step motor based on said target speed change ratio, calculate a shift amount of said drive signal due to a thermal expansion difference of parts of said continuously variable transmission according to the temperature of said continuously variable transmission, and correct said drive signal by the shift amount, and output said correct drive signal to said step motor, wherein said microprocessor is further programmed to compare said corrected drive signal with an output drive signal output, and repeat correction of said corrected drive signal such that a difference between said corrected drive signal and said output drive signal does not exceed a predetermined value.

* * * * *